United States Patent
Ko et al.

(10) Patent No.: US 10,283,116 B2
(45) Date of Patent: May 7, 2019

(54) ELECTRONIC DEVICE AND METHOD FOR PROVIDING VOICE RECOGNITION FUNCTION

(71) Applicant: Samsung Electronics Co., Ltd., Gyeonggi-do (KR)

(72) Inventors: Jae-Jeong Ko, Gyeonggi-do (KR); Hae-Young Park, Gyeonggi-do (KR); Nam-Kun Kim, Gyeonggi-do (KR); Moung-Sub Kim, Gyeonggi-do (KR); Dong-Hyoun Son, Gyeonggi-do (KR); Gun-Ho Lee, Gyeonggi-do (KR); Sung-Hye Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/399,373

(22) Filed: Jan. 5, 2017

(65) Prior Publication Data

US 2017/0206896 A1   Jul. 20, 2017

(30) Foreign Application Priority Data

Jan. 19, 2016   (KR) ........................ 10-2016-0006292

(51) Int. Cl.
| | |
|---|---|
| *G10L 15/04* | (2013.01) |
| *G10L 15/22* | (2006.01) |
| *G06F 3/0482* | (2013.01) |
| *G06F 3/16* | (2006.01) |
| *H04M 1/725* | (2006.01) |

(Continued)

(52) U.S. Cl.
CPC ............ *G10L 15/22* (2013.01); *G06F 3/0482* (2013.01); *G06F 3/16* (2013.01); *G10L 2015/088* (2013.01); *G10L 2015/223* (2013.01); *G10L 2015/225* (2013.01); *H04M 1/72519* (2013.01); *H04M 2250/74* (2013.01); *H04W 4/80* (2018.02)

(58) Field of Classification Search
CPC ......... G10L 13/00; G10L 15/24; G10L 25/63; G10L 15/22; H04N 21/4126
USPC ....................... 704/1–10, 230–257, 270–277
See application file for complete search history.

(56) References Cited

U.S. PATENT DOCUMENTS

| | | | |
|---|---|---|---|
| 8,195,467 B2 | 6/2012 | Mozer et al. | |
| 8,340,975 B1 * | 12/2012 | Rosenberger | ........... G10L 15/22 704/270 |

(Continued)

FOREIGN PATENT DOCUMENTS

| | | |
|---|---|---|
| KR | 1020080104125 | 12/2008 |
| KR | 1020130011467 | 1/2013 |
| KR | 1020140071208 | 6/2014 |

*Primary Examiner* — Huyen X Vo
(74) *Attorney, Agent, or Firm* — The Farrell Law Firm, P.C.

(57) ABSTRACT

Disclosed is a method providing voice recognition by an electronic device, including receiving a first signal including a request for triggering voice recognition from one or more external devices, triggering a program supporting the voice recognition in response to the first signal, receiving a second signal including voice data corresponding to a user's voice, performing voice recognition on the received voice data, determining an operation corresponding to the recognized voice, determining one or more performing devices which perform the determined operation, and enabling the one or more determined performing devices to perform the determined operation.

17 Claims, 13 Drawing Sheets

(51) Int. Cl.
*G10L 15/08* (2006.01)
*H04W 4/80* (2018.01)

(56) References Cited

U.S. PATENT DOCUMENTS

| | | | |
|---|---|---|---|
| 2003/0093281 A1* | 5/2003 | Geilhufe | G10L 13/00 |
| | | | 704/275 |
| 2006/0235701 A1* | 10/2006 | Cane | H04N 21/4126 |
| | | | 704/275 |
| 2007/0197164 A1 | 8/2007 | Sheynman et al. | |
| 2014/0118520 A1 | 5/2014 | Slaby et al. | |
| 2015/0006184 A1* | 1/2015 | Marti | G10L 25/63 |
| | | | 704/275 |
| 2015/0279356 A1* | 10/2015 | Lee | G10L 15/24 |
| | | | 704/251 |

\* cited by examiner

ELECTRONIC DEVICE AND METHOD FOR PROVIDING VOICE RECOGNITION FUNCTION

PRIORITY

This application claims priority under 35 U.S.C. § 119(a) to a Korean Patent Application, which was filed in the Korean Intellectual Property Office on Jan. 19, 2016 and assigned Serial No. 10-2016-0006292, the contents of which are incorporated herein by reference.

BACKGROUND

1. Field of the Disclosure

The present disclosure relates to an electronic device, and more particularly, to the electronic device and a method for providing a voice recognition function.

2. Description of the Related Art

Voice recognition technology has been increasingly implemented with the spread of portable computing terminals and the expansion of the cloud infrastructure.

Voice recognition corresponds to a technology by which a voice signal from a person is recognized and analyzed by a computer. The voice recognition technology is frequently used for inputting characters through a voice instead of a text input apparatus.

Recently, beyond a conversion from a verbal language spoken by a person into text, the voice recognition has been expanded to perform a command through the verbal language.

An electronic device, which provides a voice recognition function, may communicate with various external devices and provide a function or an operation corresponding to a voice command. However, since the electronic device does not consider a state of the electronic device or of an external device communicating with the electronic device, it is difficult for the conventional electronic device to properly perform in a given situation.

In order to perform the voice command through an external device such as a Bluetooth™ device communicating with the electronic device, a voice command separate from a trigger command for performing the voice recognition function should be individually received. For example, when a response indicating that the voice recognition function is activated, is received after the trigger voice for performing the voice recognition function is recognized through a physical button of the Bluetooth™ device, the voice command should be spoken later through a separate process. However, the voice recognition function of the electronic device is time-consuming, and therefore is overly burdensome on a user due to the repetitive operations.

Accordingly, there is a need in the art for an electronic device and method which eliminate such repetitive operations in the voice recognition function.

SUMMARY

The present disclosure has been made to address the above-mentioned problems and disadvantages, and to provide at least the advantages described below.

Accordingly, an aspect of the present disclosure is to determine a suitable performing device corresponding to the voice command according to states of the electronic device and the external device, to effectively provide a proper function or operation corresponding to the voice command.

Another aspect of the present disclosure is to reduce the time spent using a function of the electronic device for controlling a device through the voice command.

In accordance with an aspect of the present disclosure, an electronic device includes a housing, a wireless communication module located within the housing, a microphone, a speaker, a display exposed through at least a part of the housing, a memory, and a processor electrically connected to the memory, wherein the memory stores a program supporting voice recognition and store instructions that instruct the processor to receive a first signal including a request for triggering the voice recognition, to trigger the program supporting the voice recognition in response to the first signal, to receive a second signal including voice data corresponding to a user's speaking through the wireless communication module, the speaking including at least one verb but not including a target associated with the verb, to perform voice recognition on a voice included in the received voice data, to determine an operation corresponding to the recognized voice based on at least a part of the verb, to determine one or more performing devices which perform the determined operation, and to enable the one or more determined performing devices to perform the determined operation when the instructions are executed.

In accordance with another aspect of the present disclosure, a method of operating an electronic device includes receiving a first signal including a request for triggering voice recognition from the one or more external devices, triggering a program supporting the voice recognition in response to the first signal, receiving a second signal including voice data corresponding to a user's voice, performing the voice recognition on the received voice data, determining an operation corresponding to the recognized voice, determining one or more performing devices which perform the determined operation, and enabling the one or more determined performing devices to perform the determined operation.

In accordance with another aspect of the present disclosure, an electronic device includes a memory, a wireless communication module that communicates with one or more external devices, and a memory and a processor electrically connected to the memory, wherein the memory stores instructions that instruct the processor to receive a voice signal including a trigger voice and a command voice from the one or more external devices through the wireless communication module, to activate a voice function based on the trigger voice, to recognize the command voice based on the activated voice function, to determine a function corresponding to the recognized command voice, and to perform the determined function when the instructions are executed.

In accordance with another aspect of the present disclosure, a method of operating an electronic device includes receiving a voice signal including a trigger voice and a command voice from the one or more external devices, activating a voice function based on the trigger voice, recognizing the command voice based on the activated voice function, determining a function corresponding to the recognized command voice, and performing the determined function.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE DISCLOSURE

Figure 1:
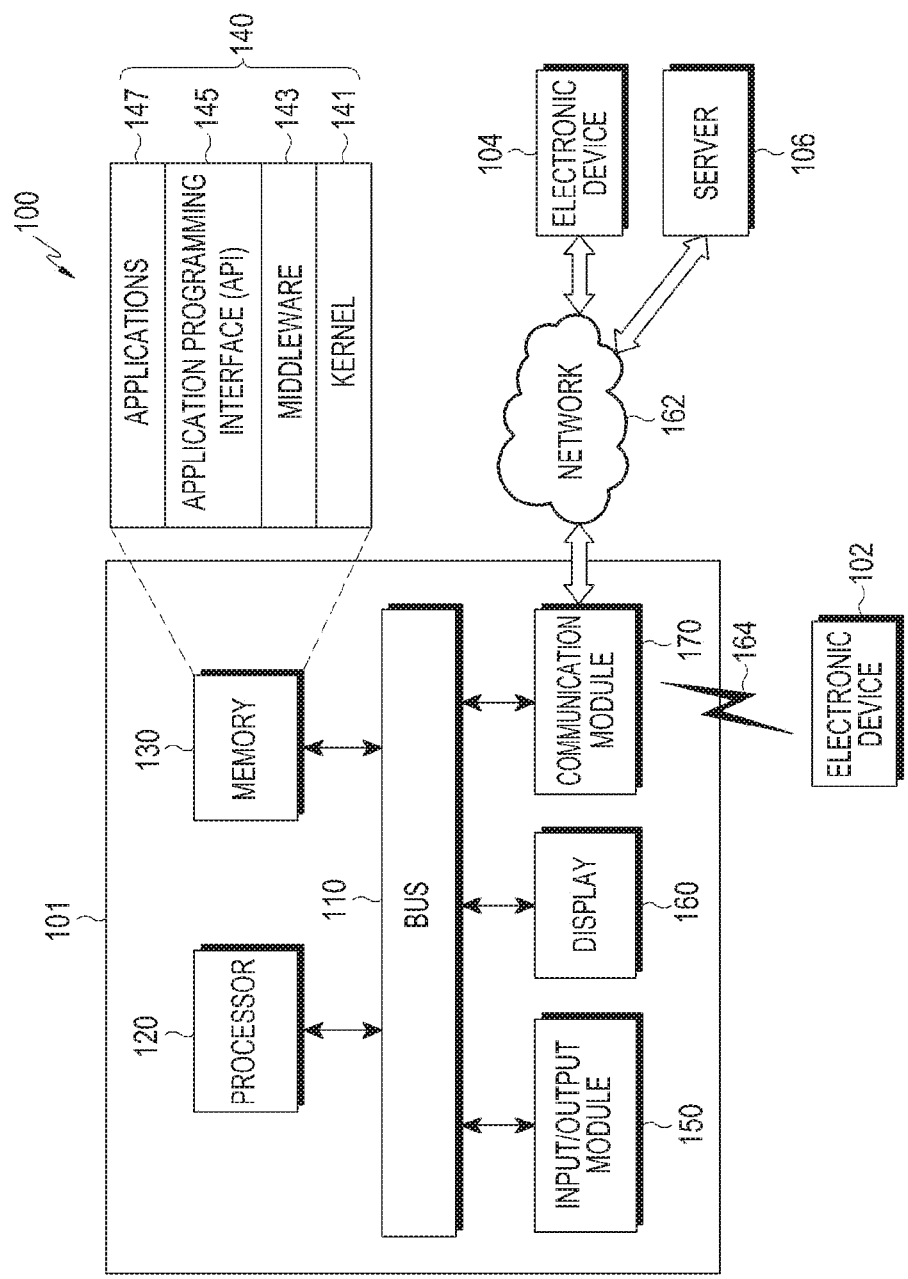
FIG. 1 is a block diagram of an electronic device and a network according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. A detailed description of known functions or configurations will be omitted for the sake of clarity and conciseness.

As used herein, the expressions "have", "may have", "include", or "may include" refer to the existence of a corresponding feature, and does not exclude one or more additional features.

In the present disclosure, the expressions "A or B", "at least one of A or/and B", and "one or more of A or/and B" include all possible combinations of the items listed, such as all of (1) including at least one A, (2) including at least one B, or (3) including all of at least one A and at least one B.

The expressions "a first", "a second", "the first", and "the second" used in embodiments of the present disclosure may modify various components regardless of the order and/or the importance but do not limit the corresponding components. For example, a first user device and a second user device indicate different user devices although both are user devices. A first element may be referred to as a second element, and similarly, a second element may be referred to as a first element without departing from the scope of the present disclosure.

When it is mentioned that one element, such as a first element, is "(operatively or communicatively) coupled with/ to or connected to" another element, such as a second element, it should be construed that the first element is directly connected to the second element or is indirectly connected to the second element via a third element. In contrast, it may be understood that when the first element is referred to as being "directly connected," or "directly coupled" to the second element, there is no third element interposed between the first and second elements.

The expression "configured to" used in the present disclosure may be exchanged with "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may indicate a dedicated or embedded processor only for performing the corresponding operations, or a generic-purpose processor, such as central processing unit (CPU) or application processor (AP) that can perform the corresponding operations by executing one or more software programs stored in a memory device.

The terms used herein are merely for the purpose of describing particular embodiments and are not intended to limit the scope of other embodiments. As used herein, singular forms include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

An electronic device according to embodiments of the present disclosure includes at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion pictures experts group (MPEG)-1 layer audio-3 (MP3) player, a mobile medical device, a camera, and a wearable device.

According to embodiments, the wearable device includes at least one of an accessory type, such as a watch, a ring, a bracelet, an anklet, a necklace, a glasses, a contact lens, or a head-mounted device (HMD), a fabric or clothing integrated type, such as electronic clothing, a body-mounted type such as a skin pad or tattoo, and a bio-implantable type, such as an implantable circuit.

According to some embodiments, the electronic device may be a home appliance. The home appliance includes at least one of a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ and PlayStation™, an electronic dictionary, an electronic key, a camcorder, and an electronic photo frame.

According to another embodiment, the electronic device includes at least one of various medical devices, such as a blood glucose monitoring device, a heart rate monitoring device, a blood pressure measuring device, or a body temperature measuring device, a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship, such as a navigation device for a ship and a gyro-compass, avionics, security devices, an automotive head unit, a robot for home or industry, an automatic teller machine (ATM) in banks, point of sales (POS) in a shop, or Internet of Things (IoT) device, a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device includes at least one of a part of furniture or a building/structure, an electronic board, an electronic signature receiving device, a projector, and various types of measuring instruments, such as a water meter, an electric meter, a gas meter, and a radio wave meter. In embodiments, the electronic device may be a combination of one or more of the aforementioned various devices. The electronic device according to some embodiments of the present disclosure may be a flexible device. The electronic device according to an embodiment of the present disclosure is not limited to the aforementioned devices, and includes a new electronic device according to the development of technology.

As used herein, the term "user" indicates a person who uses an electronic device or an artificial intelligence electronic device that uses an electronic device.

According to embodiments of the present disclosure, it is possible to effectively provide a proper function or operation corresponding to a voice command according to states of an electronic device and an external device. Therefore, a feedback according to the voice command can be efficiently provided.

Embodiments of the present disclosure enhance a user's convenience by reducing the time required to use a voice recognition function of the electronic device, provide the voice recognition function by effectively using the external device communicating with the electronic device, and improve a voice recognition rate according to a user's speech.

An electronic device 101 within a network environment 100, according to embodiments, will be described with reference to FIG. 1. The electronic device 101 includes a bus 110, a processor 120, a memory 130, an input/output module 150, a display 160, and a communication module 170. In some embodiments, the electronic device 101 may omit at least one of the above elements or may further include other elements.

The bus 110 includes a circuit for interconnecting the elements 110 to 170 and transferring communication such as control messages and/or data between the elements.

The processor 120 includes one or more of a CPU, an AP, and a communication processor (CP). For example, the processor 120 may perform operations or data processing related to control and/or communication of at least one other component of the electronic device 101.

The memory 130 includes a volatile memory and/or a non-volatile memory. The memory 130 stores instructions or data relevant to at least one other element of the electronic device 101, and stores software and/or a program 140. The program 140 includes a kernel 141, middleware 143, an application programming interface (API) 145, and/or applications 147. At least some of the kernel 141, the middleware 143, and the API 145 may be referred to as an operating system (OS).

The kernel 141 controls or manages system resources such as the bus 110, the processor 120, or the memory 130 used for performing an operation or function implemented by the other programs, such as the middleware 143, the API 145, or the applications 147, and provides an interface through which the middleware 143, the API 145, or the applications 147 may access the individual elements of the electronic device 101 to control or manage the system resources.

The middleware 143 may function as an intermediary for enabling the API 145 or the applications 147 to communicate with the kernel 141 to exchange data.

In addition, the middleware 143 processes one or more task requests received from the applications 147 according to priorities thereof. For example, the middleware 143 assigns priorities for using the system resources of the electronic device 101, to at least one of the applications 147, and performs scheduling or load balancing on the one or more task requests by processing the one or more task requests according to the priorities assigned thereto.

The applications 147 control functions provided from the kernel 141 or the middleware 143 through the API, which includes at least one interface or function for file control, window control, image processing, or text control.

The input/output module 150 functions as an interface that transfers instructions or data input from a user or another external device to the other element(s) of the electronic device 101 module 150, and outputs instructions or data received from the other element(s) of the electronic device 101 to the user or the other external device.

The display 160 includes a liquid crystal display (LCD), a light-emitting diode (LED) display, an organic light-emitting diode (OLED) display, a micro-electromechanical systems (MEMS) display, and an electronic paper display. The display 160 displays various types of contents for the user, such as text, images, videos, icons, or symbols, includes a touch screen, and receives a touch, gesture, proximity, or hovering input by using an electronic pen or a part of the user's body.

The communication module 170 sets communication between the electronic device 101 and an external device, such as a first external electronic device 102, a second external electronic device 104, or a server 106. For example, the communication module 170 may be connected to a network 162 through wireless or wired communication to communicate with the external device.

The wireless communication uses at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication includes short range communication 164 includes, such as Wi-Fi, Bluetooth™, near field communication (NFC), and global navigation satellite system (GNSS) a global positioning system (GPS), a global navigation satellite system (Glonass), a Beidou navigation satellite system (hereinafter, "Beidou"), and a European global satellite-based navigation system (Galileo), according to a use area, a bandwidth, or the like. Hereinafter, GPS may be used interchangeably used with GNSS. The wired communication includes at least one of a universal serial bus (USB), a high definition multimedia interface (HDMI), recommended standard 232 (RS-232), and a plain old telephone service (POTS). The network 462 includes at least one of a communication network such as a local area network (LAN) or a wide area network (WAN), the Internet, and a telephone network.

Each of the first and second external electronic devices 102 and 104 may be of a type identical to or different from that of the electronic device 101. The server 106 includes one or more servers. According to embodiments, all or some of the operations performed in the electronic device 101 may be performed in another electronic device or a plurality of electronic devices, such as the electronic devices 102 and 104 or the server 106.

When the electronic device 101 has to perform some functions or services automatically or in response to a request, the electronic device 101 may request performing at least some functions relating thereto to another device, such as the electronic device 102 or 104 or the server 106, instead of self-performing the functions or services. The electronic device 102 or 104 or the server 106 executes the requested functions or the additional functions, and delivers a result of the execution to the electronic device 101. The electronic device 101 processes the received result as it is or additionally processes the result to provide the requested functions or services, such as by cloud computing, distributed computing, or client-server computing technology.

Figure 2:
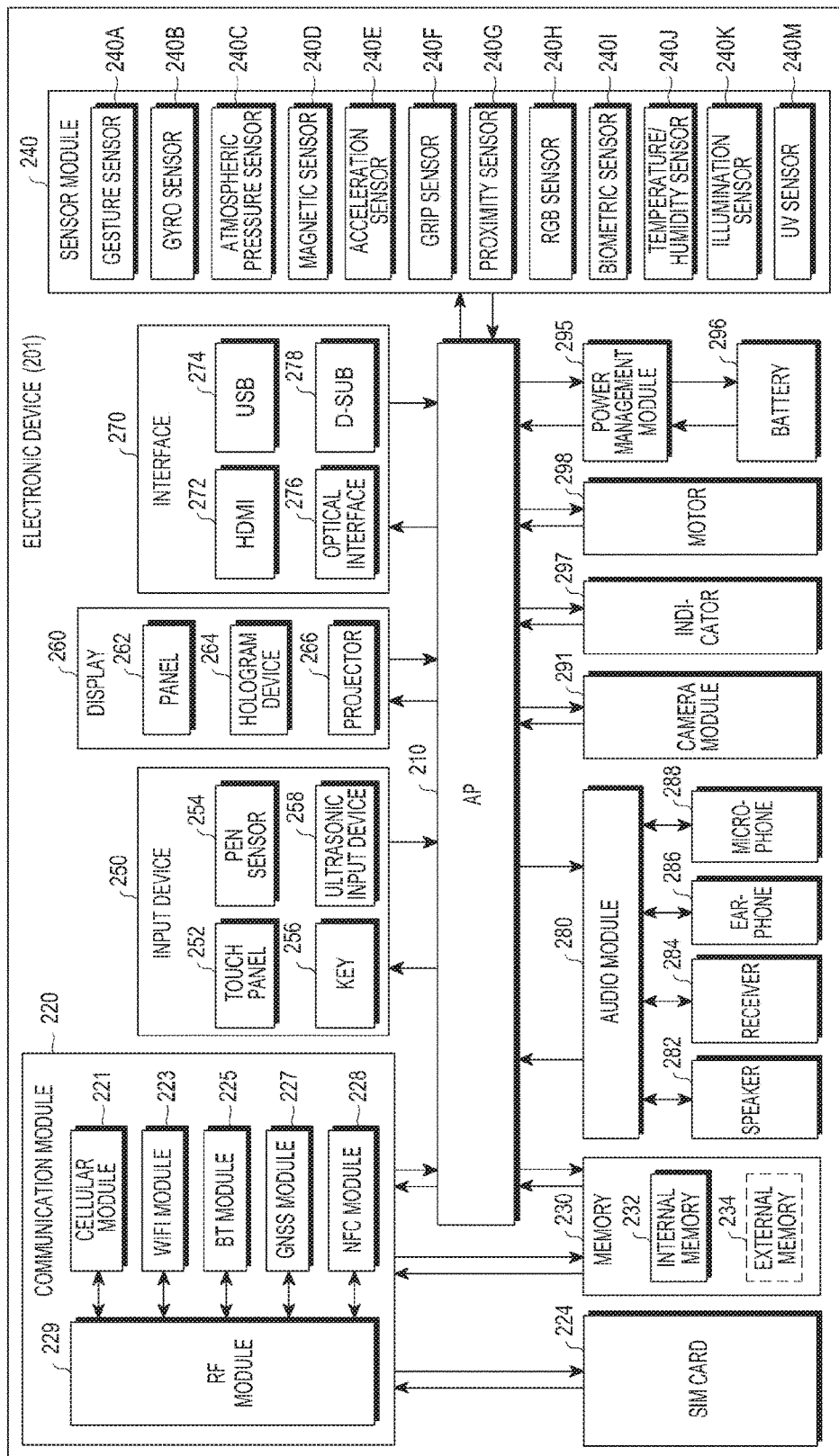
FIG. 2 is a block diagram of an electronic device according to embodiments of the present disclosure.

FIG. 2 is a block diagram of an electronic device 201 according to embodiments. The electronic device 201 includes all or part of the electronic device 101 illustrated in FIG. 1, and includes at least one processor 210, such as an application processor (AP), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 controls a plurality of hardware or software components connected to the processor 210 by driving an operating system or an application program and performs processing of various pieces of data and calculations. The processor 210 may be implemented by a system on chip (SoC) and may further include a graphic processing unit (GPU) and/or an image signal processor. The processor 210 includes at least some of the elements illustrated in FIG. 2, loads instructions or data received from a non-volatile memory into a volatile memory of the other elements, processes the loaded instructions or data, and stores various data in a non-volatile memory.

The communication module 220 has the same or a similar configuration to that of the communication module 170 of FIG. 1. The communication module 220 includes a cellular module 221, a Wi-Fi module 223, a Bluetooth™ (BT) module 225, a GNSS module 227, a near field communication (NFC) module 228, and a radio frequency (RF) module 229.

The cellular module 221 provides a voice call, an image call, a text message service, or an Internet service through a communication network. The cellular module 221 distinguishes between and authenticates electronic devices 201 within a communication network using the SIM card 224, performs at least some of the functions that the processor 210 provides, and includes a communication processor (CP).

The Wi-Fi module 223, the BT module 225, the GNSS module 227, and the NFC module 228 include a processor that processes data transmitted and received through the corresponding module. According to some embodiments, at least two of the cellular module 221, the Wi-Fi module 223, the BT module 225, the GNSS module 227, and the NFC module 228 may be included in one integrated chip (IC) or IC package.

The RF module 229 transmits/receives an RF signal and includes a transceiver, a power amp module (PAM), a frequency filter, a low noise amplifier (LNA), and an antenna. According to another embodiment of the present disclosure, at least one of the cellular module 221, the Wi-Fi module 223, the BT module 225, the GNSS module 227, and the NFC module 228 transmits/receives an RF signal through a separate RF module.

The SIM card 224 includes a subscriber identity module and/or an embedded SIM, and may contain unique identification information, such as an integrated circuit card identifier (ICCID), or subscriber information, such as an international mobile subscriber identity (IMSI).

The memory 230 includes an internal memory 232 and may include an external memory 234. The internal memory 232 includes at least one of a volatile memory, such as a dynamic random access memory (DRAM), a static RAM (SRAM), or a synchronous dynamic RAM (SDRAM), and a non-volatile memory, such as a one time programmable read only memory (OTPROM), a programmable ROM (PROM), an erasable and programmable ROM (EPROM), an electrically erasable and programmable ROM (EEPROM), a mask ROM, a flash ROM, a flash memory such as a NAND or a NOR flash memory, a hard driver, or a solid state drive (SSD).

The external memory 234 may further include a flash drive a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 measures a physical quantity or detects an operation state of the electronic device 201, and converts the measured or detected information into an electrical signal. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as a red, green, blue (RGB) sensor, a biometric sensor 240I, a temperature/humidity sensor 240J, a light (illumination) sensor 240K, and an ultraviolet (UV) sensor 240M.

Additionally or alternatively, the sensor module 240 includes an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 further includes a control circuit for controlling one or more sensors included therein. The electronic device 201 further includes a processor configured to control the sensor module 240 as a part of or separately from the processor 210, and controls the sensor module 240 while the processor 210 is in a sleep state.

The input device 250 includes a touch panel 252, a (digital) pen sensor 254, a key 256, and an ultrasonic input unit 258. The touch panel 252 uses at least one of a capacitive scheme, a resistive scheme, an infrared scheme, and an ultrasonic scheme. The touch panel 252 may further include a control circuit. The touch panel 252 may further include a tactile layer that provides a tactile reaction to the user.

The (digital) pen sensor 254 includes a recognition sheet which is a part of the touch panel or is separated from the touch panel. The key 256 includes a physical button, an optical key or a keypad. The ultrasonic input device 258 detects ultrasonic waves generated by an input tool through a microphone 288 and identifies data corresponding to the detected ultrasonic waves.

The display 260 includes a panel 262, a hologram device 264 and a projector 266. The panel 262 includes a configuration identical or similar to that of the display 160 illustrated in FIG. 1, and is implemented to be flexible, transparent, or wearable. The panel 262 and the touch panel 252 may be implemented as one module. The hologram 264 displays a three dimensional image in the air by using an interference of light. The projector 266 displays an image by projecting light onto a screen. The screen may be located in the interior of or on the exterior of the electronic device 201. The display 260 further includes a control circuit for controlling the panel 262, the hologram device 264, or the projector 266.

The interface 270 includes a high-definition multimedia interface (HDMI) 272, a universal serial bus (USB) 274, an optical interface 276, and a d-subminiature (D-sub) 278. The interface 270 may be included in the communication module 170 illustrated in FIG. 1. Additionally or alternatively, the interface 270 includes a mobile high-definition link (MHL) interface, a secure digital (SD) card/multi-media card (MMC) interface, or an infrared data association (IrDA) standard interface.

The audio module 280 bilaterally converts a sound and an electrical signal. At least some elements of the audio module 280 may be included in the input/output module 150 illustrated in FIG. 1. The audio module 280 processes sound information which is input or output, such as through a speaker 282, a receiver 284, earphones 286, or the microphone 288.

The camera module 291 photographs a still image and a dynamic image, and includes one or more image sensors, a lens, an image signal processor (ISP), and a flash, such as a light-emitting diode (LED) or xenon lamp.

The power management module 295 manages power of the electronic device 201 and includes a power management integrated circuit (PMIC), a charger integrated circuit (IC), or a battery gauge. The PMIC uses a wired and/or wireless charging method. Examples of the wireless charging method include a magnetic resonance method, a magnetic induction method and an electromagnetic method. Additional circuits, such as a coil loop, a resonance circuit, and a rectifier, may be further included for wireless charging. The battery gauge measures a residual quantity of the battery 296, and a voltage, a current, or a temperature during the charging, and includes a rechargeable battery or a solar battery.

The indicator 297 indicates a particular state, such as a booting, message, or charging state of the electronic device 201 or a part of the electronic device 201. The motor 298 converts an electrical signal into mechanical vibration, and generate vibration or a haptic effect, for example. The electronic device 201 includes a graphics processing unit (GPU) for supporting a mobile television (TV). The GPU processes media data according to a standard, such as digital multimedia broadcasting (DMB), digital video broadcasting (DVB), or mediaFLO™.

Figure 3:
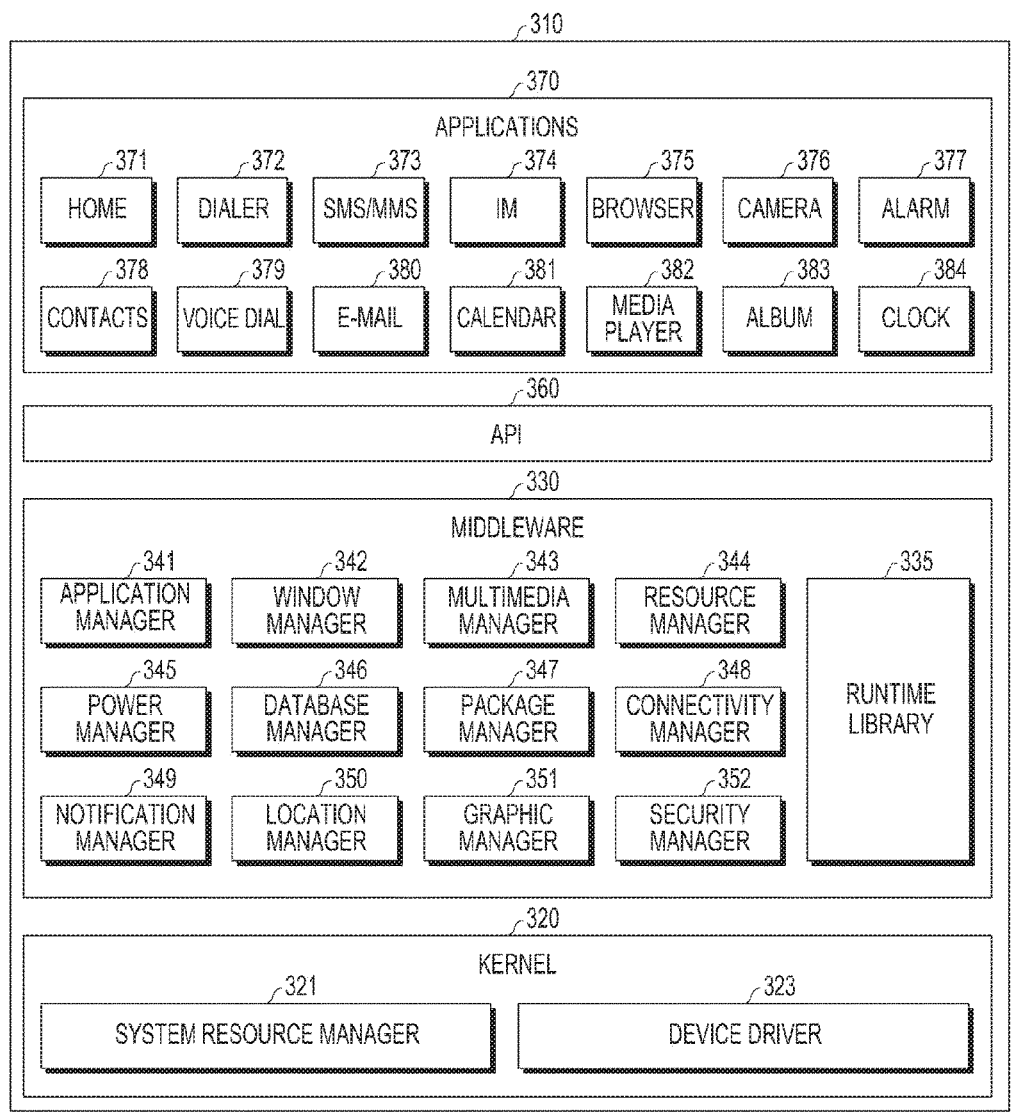
FIG. 3 is a block diagram of a program module according to embodiments of the present disclosure.

FIG. 3 is a block diagram of a program module according to embodiments of the present disclosure. The program module 310 includes an OS for controlling resources related to the electronic device 101 and/or various applications 147 executed in the operating system. The operating system may be Android, iOS, Windows, Symbian, Tizen, or Bada, for example.

The program module 310 includes a kernel 320, middleware 330, an application programming interface (API) 360, and/or applications 370. At least some of the program module 310 may be preloaded on the electronic device, or may be downloaded from the electronic device 102 or 104, or the server 106.

The kernel 320 includes a system resource manager 321 and/or a device driver 323. The system resource manager 321 controls, assigns, or collects system resources, and includes a process manager, a memory manager, or a file system manager. The device driver 323 includes a display driver, a camera driver, a BT driver, a shared memory driver, a USB driver, a keypad driver, a Wi-Fi driver, an audio driver, or an inter-process communication (IPC) driver.

The middleware 330 provides a function required by the applications 370 in common or provides various functions to the applications 370 through the API 360 so that the applications 370 can efficiently use limited system resources within the electronic device. According to an embodiment, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes a library module that a compiler uses in order to add new functions through a programming language while the applications 370 are executed. The runtime library 335 performs input/output management, memory management, or a function for an arithmetic function.

The application manager 341 may manage a life cycle of at least one of the applications 370. The window manager 342 manages graphical user interface (GUI) resources used on a screen. The multimedia manager 343 identifies formats required for the reproduction of various media files and encode or decode a media file using a codec suitable for the corresponding format. The resource manager 344 manages resources of at least one of the applications 370, such as a source code, a memory, and a storage space.

The power manager 345 may operate together with a basic input/output system (BIOS) to manage a battery or power and provides power information required for the operation of the electronic device. The database manager 346 may generate, search, or change a database to be used in at least one of the applications 370. The package manager 347 manages the installation or the updating of an application distributed in the form of a package file.

The connectivity manager 348 manages a wireless connection such as Wi-Fi or Bluetooth. The notification manager 349 displays or notify of an event, such as an arrival message, an appointment, proximity notification, and the like, in such a manner of not disturbing a user. The location manager 350 manages location information of the electronic device. The graphic manager 351 manages a graphic effect to be provided to a user and a user interface relating to the graphic effect. The security manager 352 provides all security functions required for system security or user authentication. When the electronic device has a telephone call function, the middleware 330 may further include a telephony manager for managing a voice call function or a video call function of the electronic device.

The middleware 330 includes a middleware module that forms combinations of various functions of the above described elements. The middleware 330 provides specialized modules according to types of operating systems in order to provide differentiated functions, and dynamically removes some of the existing elements, or may add new elements.

The API 360 is a set of API programming functions, and may be provided with a different configuration according to an OS. For example, in the case of Android or iOS, one API set may be provided for each platform, and in the case of Tizen, two or more API sets may be provided for each platform.

The applications 370 include one or more applications that can perform functions, such as home 371, dialer 372, short message service/multimedia messaging service (SMS/MMS) 373, instant message (IM) 374, browser 375, camera 376, alarm 377, contacts 378, voice dialer 379, e-mail 380, calendar 381, media player 382, album 383, clock 384, health care application, such as for measuring exercise or blood sugar), or environment information application, such as for measuring atmospheric pressure, humidity, or temperature information.

The applications 370 include an information exchange application supporting information exchange between the electronic device 101 and an external electronic device 102 or 104. The application associated with exchanging information includes a notification relay application for notifying an external electronic device of certain information or a device management application for managing an external electronic device.

For example, the notification relay application includes a function of transferring, to the external electronic device 102 or 104, notification information generated from other applications of the electronic device 101, such as SMS/MMS, e-mail, health management, or environmental information application. The notification relay application receives notification information from the external electronic device and provides the received notification information to the user.

The device management application installs, deletes, or updates at least one function of an external electronic device 102 or 104 communicating with the electronic device, such as turning on/off the external electronic device or components thereof, or adjusting a resolution of the display, applications operating in the external electronic device, or services such as a call or message service provided by the external electronic device.

The applications 370 may be designated according to attributes of the external electronic device 102 or 104, and may be received from the external electronic device, such as the server 106 or the electronic device 102 or 104. The applications 370 include a preloaded application or a third party application that can be downloaded from the server. Names of the elements of the program module 310, according to the above-described embodiments of the present disclosure, may vary depending on the type of OS.

According to embodiments of the present disclosure, at least some of the program module 310 may be implemented in software, firmware, hardware, or a combination of two or more thereof. At least some of the program module 310 may be executed by the processor 210. At least some of the program module 310 includes a module, a program, a routine, a set of instructions, and/or a process for performing one or more functions.

Figure 4:
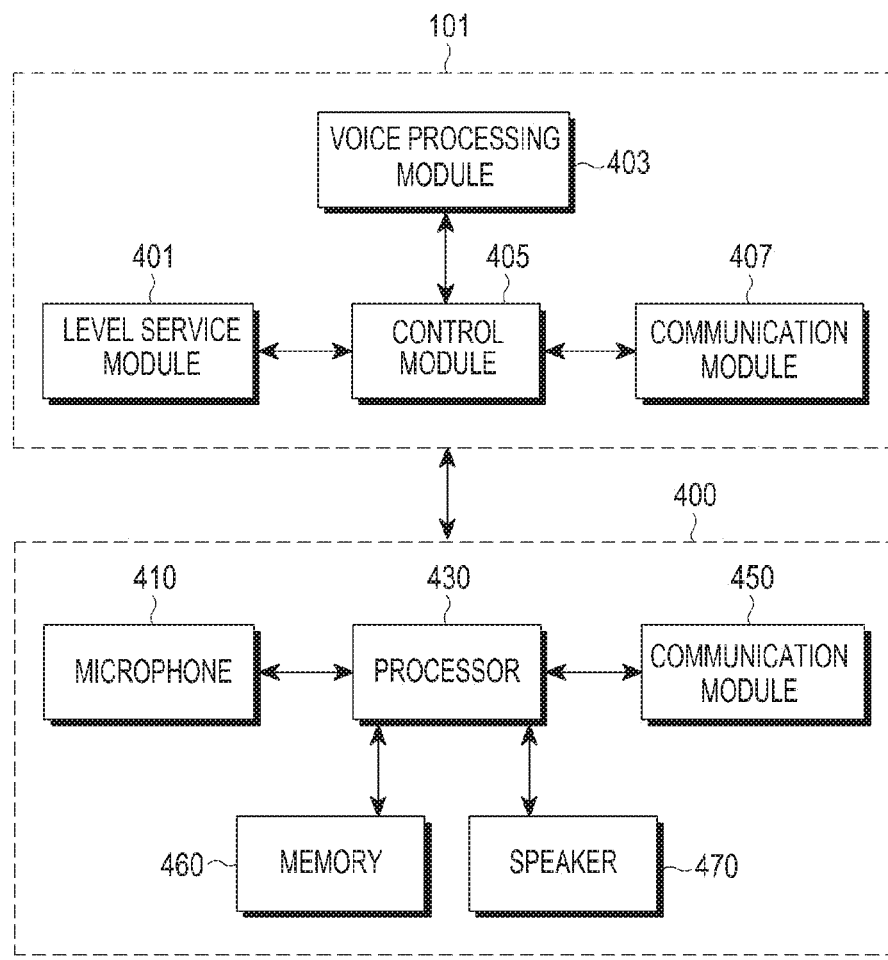
FIG. 4 illustrates a configuration of an audio device connected to an electronic device according to embodiments of the present disclosure.

FIG. 4 illustrates a configuration of an audio device connected to an electronic device according to embodiments of the present disclosure.

Referring to FIG. 4, the electronic device 101 includes a level service module 401, a voice processing module 403, a control module 405, and a communication module 407.

The level service module 401 distinguishes between a trigger voice and a voice command in a voice received from an external device such as an audio device 400 and transfers the trigger voice and the command voice to the voice processing module 403 or the control module 405 described below to recognize each of the distinguished trigger voice and command voice. For example, the level service module 401 transfers the trigger voice to enable the voice processing module 403 to activate a voice function, and transfers the command voice when the voice function is activated according to the transferred trigger voice.

The voice processing module 403 activates the voice function, recognizes the command voice based on the received voice, and transfers a command corresponding to the recognized command voice to the control module 405.

The control module 405 determines a function corresponding to the received command and determines a performing device that performs the operation corresponding to the determined function. The control module 405 generates a feedback signal, which is a control signal for performing the determined function, and transfers the generated feedback signal to the performing device.

The communication module 407 may communicate with another device, such as the audio device 400 or the server 106, and may correspond to the above described communication module 170 or 220.

Each of the level service module 401, the voice processing module 402, and the control module 405 may be configured as one or more processors. The level service module 401, the voice processing module 403, and the control module 405 may be configured as one processor.

The audio device 400 connected to the electronic device 101 includes a microphone 410, a processor 430, a communication module 450, a memory 460, and a speaker 470. Herein, the audio device 400 may be the above-described external electronic device 102 or 104.

The microphone 410 acquires a voice or an audio signal, and may be activated full-time or based on an input or a condition.

The processor 430 performs calculations or data processing related to control and/or communication of at least one other element of the audio device 400.

The communication module 450 establishes communication between the audio device 400 and the electronic device 101. For example, the communication module 450 may communicate with the electronic device 101 through wireless communication or wired communication.

The memory 460 stores various pieces of data. The speaker 470 outputs an audio signal.

The electronic device 101 according to embodiments may be connected to the audio device 400, and these devices may communicate with each other. The connection between the electronic device 101 and the audio device 400 is wireless or wired communication. Accordingly, each of the electronic device 101 and the audio device 400 may request a function or a service to another device and perform a requested function or service.

For example, based on an audio signal received from the electronic device 101, the audio device 400 outputs audio data corresponding to the received audio signal through the speaker 470. In another example, the audio device 400 transmits a voice signal for a voice acquired through the microphone 410 to the electronic device 101 through the communication module 450.

Figure 5A:
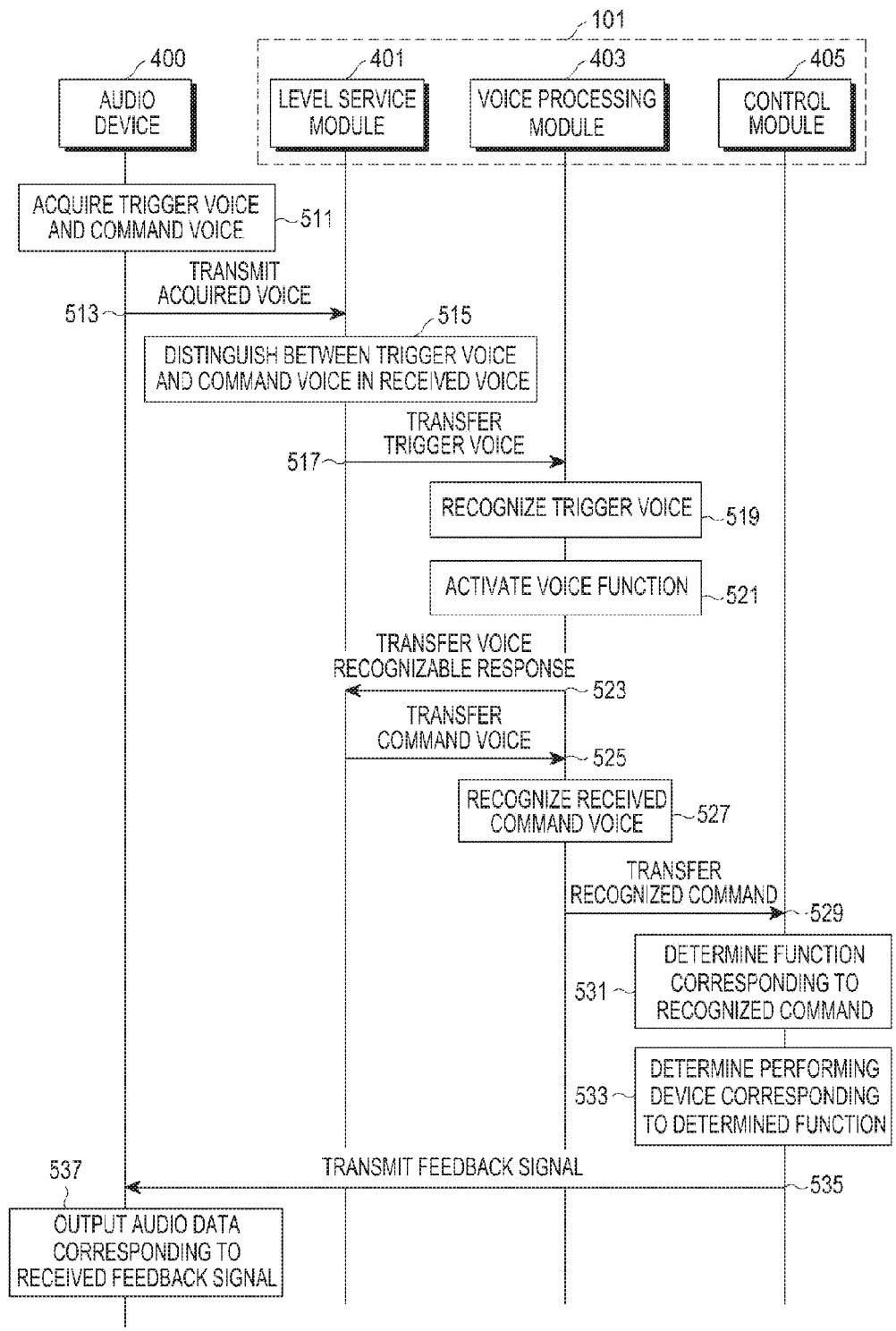
FIGS. 5A, 5B and 5C illustrate a method of operating an electronic device according to embodiments of the present disclosure.

FIG. 5A illustrates a method of operating an electronic device according to embodiments of the present disclosure.

Referring to FIG. 5A, the audio device 400 acquires a user's trigger voice and command voice in step 511, such as through the microphone 410. The trigger voice signal includes a voice for activating a voice function of the electronic device 101. The command voice signal includes a voice for enabling at least one of the electronic device 101 and an external device to perform a function. The command voice may not include information on a target associated with the command, such as the external device which performs an operation according to the command.

In step 513, the audio device 400 transmits a voice signal including the acquired trigger voice and command voice to the electronic device 101, such as through the communication module 450.

In step 515, the level service module 401, distinguishes between the trigger voice and the command voice in the received voice. For example, the electronic device 101 receives the voice signal transmitted by the audio device 400 through the communication module 220. The level service module 401 distinguishes between the trigger voice and the command voice in the received voice signal, identifies a predetermined trigger voice in a total voice including the trigger voice and a command voice, and then identifies the command voice by excluding the identified trigger voice from the total voice.

In step 517, the level service module 401 transfers the trigger voice to the voice processing module 403 to recognize the trigger voice. For example, the level service module 401 transfers the trigger voice to the voice processing module 403 to cause the voice processing module 403 activate the voice function.

In step 519, the voice processing module 403, recognizes the received trigger voice. In step 521, the voice processing module 403 activates the voice function for recognizing the command voice. In step 523, the voice processing module 403 transfers a voice recognizable response signal, which informs that the voice can be recognized, to the level service module 401. In step 525, the level service module 401 transfers the command voice to the voice processing module 403 in response to the received voice recognizable response signal.

In step 527, the voice processing module 403 recognizes the received command voice. For example, the voice processing module 403 converts the received command voice into text and recognizes the converted text. The voice processing module 403 recognizes a command corresponding to the command voice based on the converted text. In step 529, the voice processing module 403 transfers the recognized command to the control module 405.

In step 531, the control module 405 determines a function corresponding to the recognized command, which has been transmitted from the voice processing module 403. In step 533, the control module 405 determines a performing device corresponding to the determined function, for example, as one or more of the electronic device 101 and external devices including the audio device 400. The control module 405 determines the device to perform the determined function as at least one external device which can perform an operation corresponding to one of a characteristic of a verb included in the recognized command and the determined function.

In step 535, the control module 405 transmits a feedback signal, which is a control signal for performing the determined function, to the performing device corresponding to the determined function. When the determined performing device is the audio device 400, the control module 405 transmits the feedback signal to the audio device 400.

According to another embodiment, when the determined performing device is the electronic device 101, the control module 405 transfers the feedback signal to an element corresponding to the determined function. The electronic device 101 transmits the feedback signal for performing the determined function to an external device corresponding to the determined performing device as well as the audio device 400.

In step 537, the audio device 400 corresponding to the performing device performs an audio output which is the function corresponding to the received feedback signal. According to an embodiment, the audio device 400 outputs audio data corresponding to the command voice in response to the received feedback signal.

When the determined performing device is not the audio device 400, the feedback signal may be transmitted to the determined performing device, and the performing device having received the feedback signal such as the external device, performs the function corresponding to the received feedback signal as described above.

When the determined performing device is the electronic device 101, the feedback signal may be transmitted to the element of the electronic device 101 corresponding to the determined function, and at least one element of the electronic device 101 having received the feedback signal performs the function corresponding to the received feedback signal as described above.

Figure 5B:
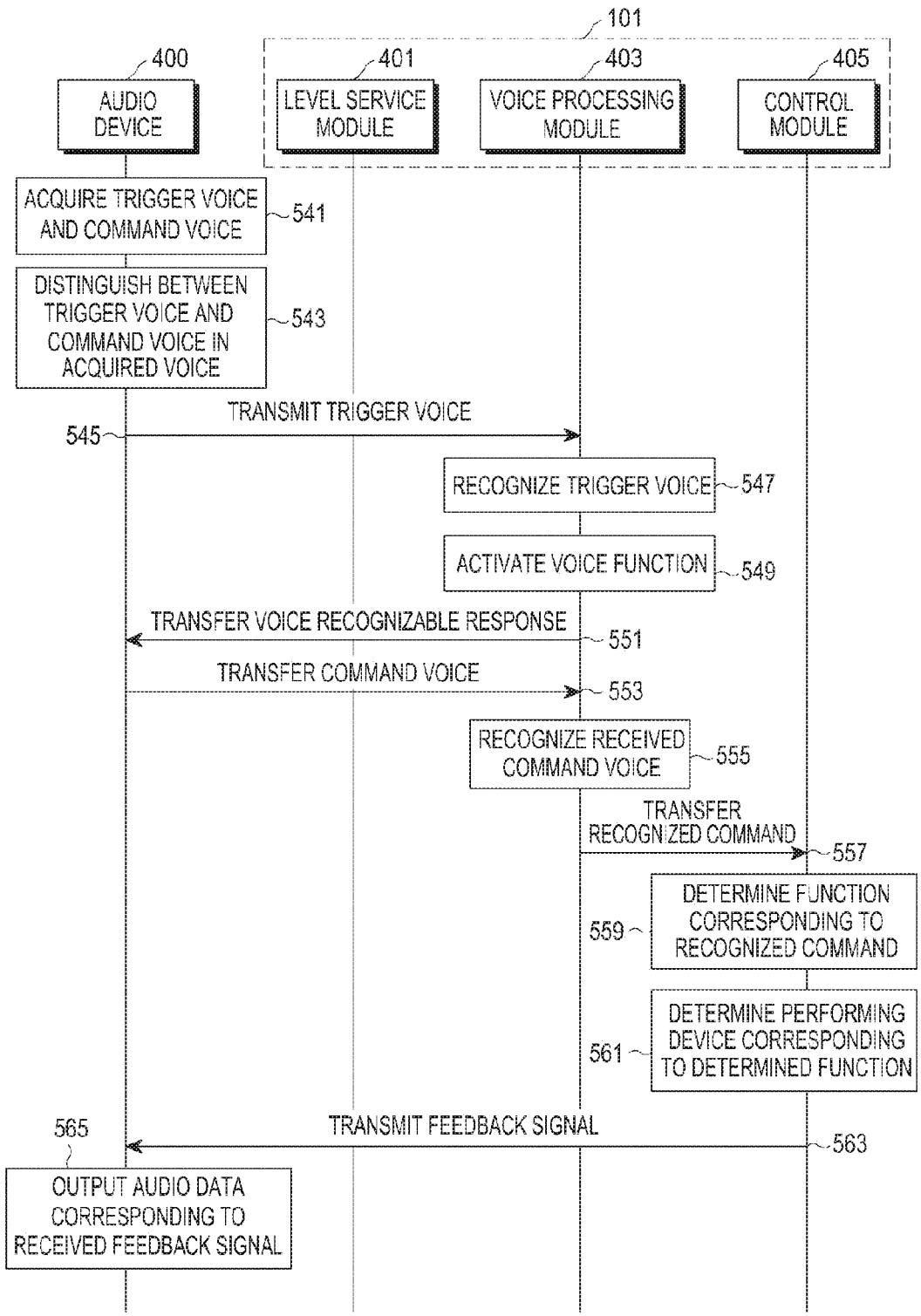

FIG. 5B illustrates a method of operating an electronic device according to embodiments of the present disclosure.

Referring to FIG. 5B, the audio device 400 acquires a user's trigger voice and command voice in step 541. For example, the audio device 400 acquires the user's trigger voice and command voice through the microphone 410. The trigger voice signal includes a voice for activating a voice function of the electronic device 101. The command voice signal includes a voice for enabling at least one external device to perform a function.

In step 543, the processor 430 distinguishes between the trigger voice and the command voice in the acquired voice. For example, the processor 430 identifies a predetermined trigger voice in a total voice including the trigger voice and a command voice, identifies the command voice by excluding the identified trigger voice from the total voice, and stores data on at least one of the distinguished trigger voice and command voice in the memory 460.

In step 545, the audio device 400 transmits the distinguished trigger voice to the electronic device 101. For example, the audio device 400 transmits a first signal including the acquired trigger voice to the electronic device 101 though the communication module 450. The transmitted first signal may be transferred to the voice processing module 403 through the communication module 407 of the electronic device 101 or transmitted to the voice processing module 403 via the level service module 401.

In step 547, the voice processing module 403 recognizes the trigger voice included in the received first signal. In step 549, the voice processing module 403 activates the voice function for recognizing the command voice. In step 551, the voice processing module 403 transmits a voice recognizable response signal, which informs that the voice can be recognized, to the audio device 400 through the communication module 407.

In step 553, the audio device 400 transmits the command voice to the electronic device 101 in response to the received voice recognizable response signal. For example, the processor 430 transmits a second signal including the command voice to the voice processing module 403 of the electronic device 101 through the communication module 450.

In step 555, the voice processing module 403 recognizes the command voice included in the received second signal. For example, the voice processing module 403 converts the received command voice into text and recognizes the converted text. The voice processing module 403 recognizes a command corresponding to the command voice based on the converted text. In step 557, the voice processing module 403 transfers the recognized command to the control module 405.

In step 559, the control module 405 determines a function corresponding to the recognized command, which has been transmitted from the voice processing module 403. In step 561, the control module 405 determines a performing device corresponding to the determined function, for example, as one or more of the electronic device 101 and external devices including the audio device 400. The control module 405 determines the device to perform the determined function as at least one external device which can perform an operation corresponding to one of a characteristic of a verb included in the recognized command and the determined function.

In step 563, the control module 405 transmits a feedback signal, which is a control signal for performing the determined function, to the performing device corresponding to the determined function. When the determined performing device is the audio device 400, the control module 405 transmits the feedback signal to the audio device. According to another embodiment, when the determined performing device is the electronic device 101, the control module 405 transfers the feedback signal to an element corresponding to the determined function. The electronic device 101 transmits the feedback signal for performing the determined function to an external device corresponding to the determined performing device as well as the audio device 400.

In step 565, the audio device 400 corresponding to the performing device performs an audio output which is the function corresponding to the received feedback signal. The audio device 400 outputs audio data corresponding to the command voice in response to the received feedback signal.

When the determined performing device is not the audio device 400, the feedback signal may be transmitted to the determined performing device and the performing device having received the feedback signal the external device performs the function corresponding to the received feedback signal as described above.

When the determined performing device is the electronic device 101, the feedback signal may be transmitted to the element of the electronic device 101 corresponding to the determined function and at least one element of the electronic device 101 having received the feedback signal performs the function corresponding to the received feedback signal as described above.

Figure 5C:
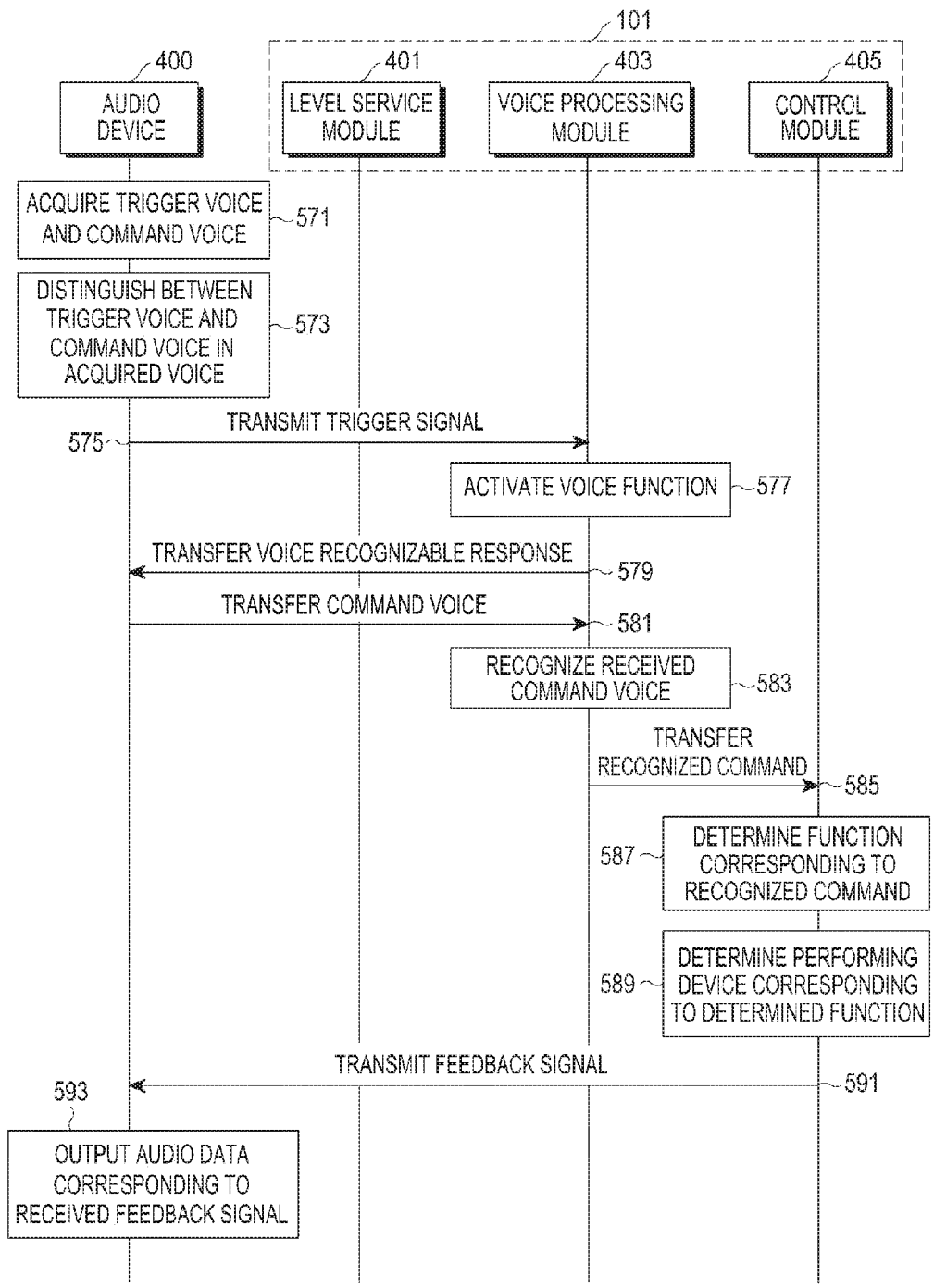

FIG. 5C illustrates a method of operating an electronic device according to embodiments of the present disclosure.

Referring to FIG. 5C, the audio device 400 acquires a user's trigger voice and command voice in step 571, such as through the microphone 410. The trigger voice signal includes a voice for activating a voice function of the electronic device 101. The command voice signal includes a voice for enabling at least one external device to perform a function.

In step 573, the audio device 400 such as the processor 430, distinguishes between the trigger voice and the command voice in the acquired voice. For example, the processor 430 distinguishes a predetermined trigger voice in a total voice including the trigger voice and a command voice and then identifies the command voice by excluding the distinguished trigger voice from the total voice. The audio device 400 stores data on at least one of the distinguished trigger voice and command voice in the memory 460. For example, the processor 430 stores data on at least one of the distinguished trigger voice and command voice in the memory 460.

In step 575, the audio device 400 transmits a trigger signal corresponding to the distinguished trigger voice to the electronic device 101. For example, the audio device 400 generates the trigger signal corresponding to the acquired trigger voice and transmits the generated trigger signal to the electronic device 101 through the communication module 450. The transmitted trigger signal may be transferred to the voice processing module 403 through the communication module 407 of the electronic device 101 or transmitted to the voice processing module 403 via the level service module 401. The trigger signal may be a first signal or may be included in the first signal.

In step 577, the voice processing module 403 activates a voice function for recognizing the command voice based on the received trigger voice. In step 579, the voice processing module 403 transmits a voice recognizable response signal, which informs that the voice can be recognized, to the audio device 400 through the communication module 407.

In step 581, the audio device 400 transmits the command voice to the electronic device 101 in response to the received voice recognizable response signal. For example, the processor 430 transmits a second signal including the command voice to the voice processing module 403 of the electronic device 101 through the communication module 450.

In step 583, the voice processing module 403 recognizes the command voice included in the received second signal. For example, the voice processing module 403 converts the received command voice into text, recognizes the converted text, and recognizes a command corresponding to the command voice based on the converted text. In step 585, the voice processing module 403 transfers the recognized command to the control module 405.

In step 587, the control module 405 determines a function corresponding to the recognized command, which has been transmitted from the voice processing module 403. In step 589, the control module 405 determines a performing device to perform the determined function, as one or more of the electronic device 101 and external devices including the audio device 400. The control module 405 determines the device to perform the determined function as at least one external device which can perform an operation corresponding to one of a characteristic of a verb included in the recognized command and the determined function.

In step 591, the control module 405 transmits a feedback signal, which is a control signal for performing the determined function, to the performing device corresponding to the determined function. When the determined performing device is the audio device 400, the control module 405 transmits the feedback signal to the audio device 400. According to another embodiment, when the determined performing device is the electronic device 101, the control module 405 transfers the feedback signal to an element corresponding to the determined function. The electronic device 101 transmits the feedback signal for performing the determined function to an external device corresponding to the determined performing device as well as the audio device 400.

In step 593, the audio device 400 corresponding to the performing device performs an audio output which is the function corresponding to the received feedback signal. The audio device 400 outputs audio data corresponding to the command voice in response to the received feedback signal.

When the determined performing device is not the audio device 400, the feedback signal may be transmitted to the determined performing device and the performing device having received the feedback signal the external device performs the function corresponding to the received feedback signal as described above.

When the determined performing device is the electronic device 101, the feedback signal may be transmitted to the element of the electronic device 101 corresponding to the determined function, and at least one element of the electronic device 101 having received the feedback signal performs the function corresponding to the received feedback signal as described above.

Figure 6:
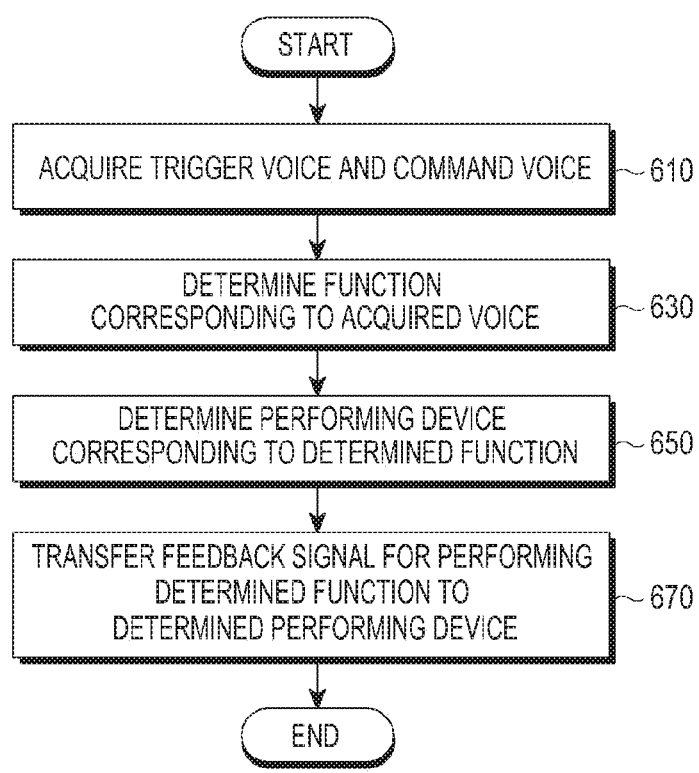
FIG. 6 illustrates a method of determining a performing device according to embodiments of the present disclosure.

FIG. 6 illustrates the method of determining the performing device according to embodiments of the present disclosure.

Referring to FIG. 6, the electronic device 101 acquires a trigger voice and a command voice in step 610. The electronic device 101 receives a voice signal including the trigger voice and the command voice from the audio device 400 and acquires the trigger voice and the command voice based on the received voice signal. According to another embodiment, the electronic device 101 acquires the trigger voice and the command voice through the microphone 288 included in the electronic device 101.

In step 630, the electronic device 101 the processor 120 or 210 determines a function corresponding to the acquired voice. The processor 120 or 210 recognizes the trigger voice in the acquired trigger voice and command voice and activates a voice function based on the recognized trigger voice. The processor 120 or 210 recognizes the acquired command voice based on the activated voice function and determines a function corresponding to a command of the recognized command voice.

In step 650, the electronic device 101 determines at least one performing device corresponding to the determined function among a plurality of performing devices. For example, the processor 120 or 210 determines at least one of the electronic device 101 and an external device as at least one performing device corresponding to the determined function. The external device includes various devices which can communicate with the electronic device 101. The processor 120 or 210 determines the device to perform the determined function as at least one external device which can perform an operation corresponding to one of a characteristic of a verb included in the recognized command and the determined function.

When the determined function is a display function, the processor 120 or 210 determines a device including a display as the performing device, or determines the electronic device 101 including the display 260 as the performing device.

According to another embodiment, when the determined function is an audio output function, the processor 120 or 210 determines a device including a speaker as the performing device. When the determined function is the audio output function and the command voice is received from the audio device 400, the processor 120 or 210 determines the audio device 400 as the performing device. Alternatively, when the determined function is the audio output function and the command voice is acquired through the microphone 288, the processor 120 or 210 determines the electronic device 101 as the performing device.

The electronic device 101 according to embodiments of the present disclosure acquires an input for selecting one or more candidate devices from a plurality of candidate devices which can perform the determined operation. The electronic device 101 determines at least one performing device which performs the determined operation among the one or more selected candidate devices. For example, the electronic device 101 acquires device information of each of the one or more candidate devices and stores the acquired device information. The electronic device 101 determines at least one performing device which performs the determined operation among the one or more candidate devices based on the stored device information. The device information includes various pieces of information related to each candidate device. For example, the device information includes various pieces of information related to the function of the candidate device.

The electronic device 101 acquires an input for selecting one or more candidate devices from the electronic device 101 and the audio device 400, corresponding to the plurality of candidate devices which can perform the determined operation. The electronic device 101 determines the performing device, which performs the determined operation, among the selected candidate devices based on the acquired input. For example, when the selected candidate device is the electronic device 101, the electronic device 101 determines the electronic device as the performing device which performs the determined operation.

In step 670, the electronic device 101 transfers a feedback signal, which is a control signal for performing the determined function, to the determined performing device. Accordingly, the performing device having received the feedback signal performs a function corresponding to the feedback signal.

According to an embodiment, when the one or more performing devices corresponding to the determined function among a plurality of performing devices are determined as the audio device 400 which is the external device, the processor 120 or 210 transmits the feedback signal corresponding to the control signal for performing the determined function to the audio device 400. The audio device 400 outputs audio data corresponding to the received feedback signal.

According to another embodiment, when the one or more performing devices corresponding to the determined function among the plurality of performing devices are determined as the electronic device 101, the processor 120 or 210 transmits the feedback signal corresponding to the control signal for performing the determined function to an element of the electronic device 101 corresponding to the determined function. For example, when the determined function is a display function, the processor 120 or 210 transfers a feedback signal to the display 260 to display an image corresponding to the determined function. The display 260 displays an image corresponding to the received feedback signal.

Figure 7:
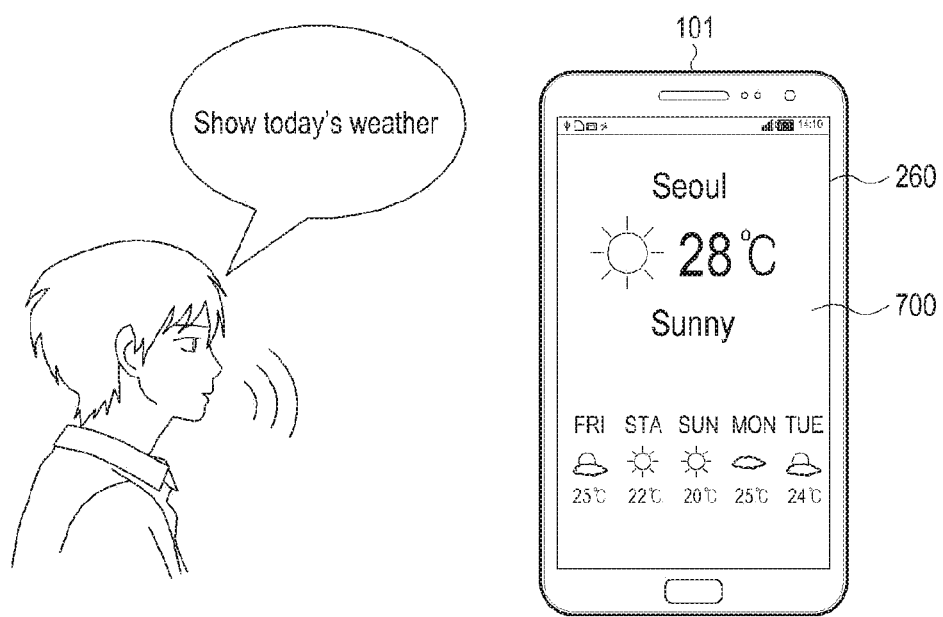
FIG. 7 illustrates an example of an operation according to the determined performing device according to embodiments of the present disclosure.

FIG. 7 illustrates an example of the operation according to the determined performing device according to embodiments of the present disclosure.

Referring to FIG. 7, when a command voice of "Show today's weather" is acquired, the electronic device 101 determines a function according to the acquired command voice as a display function. The electronic device 101 acquires information on today's weather in response to the acquired command voice. The processor 120 or 210 of the electronic device 101 enables the display 260 to display an image 700 for toady's weather. Accordingly, the display 260 of the electronic device 101 displays the image 700 for today's weather.

Figure 8:
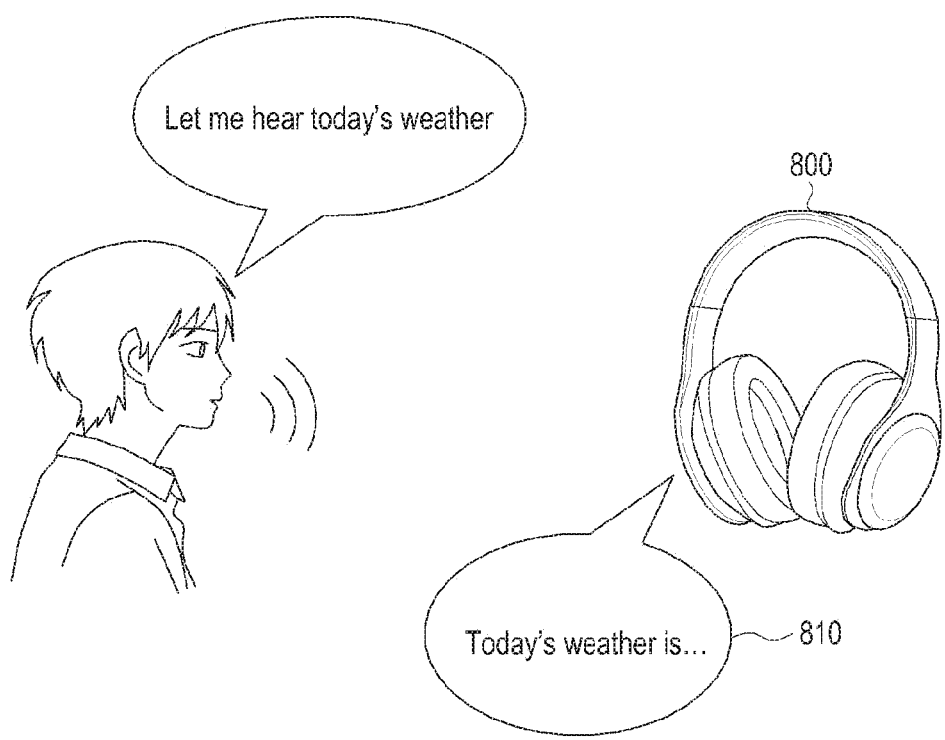
FIG. 8 illustrates an example of an operation according to the determined performing device according to embodiments of the present disclosure.

FIG. 8 illustrates an example of the operation according to the determined performing device according to embodiments of the present disclosure.

Referring to FIG. 8, when a command voice of "Let me hear today's weather" is acquired, the electronic device 101 determines a function according to the acquired command voice as an audio output function. The electronic device 101 acquires information on today's weather in response to the acquired command voice. The processor 120 or 210 of the electronic device 101 transmits a feedback signal to the audio device 400 such that the audio device 400 can output a voice 810 for today's weather. The audio device 400 outputs the voice 810 for today's weather based on the received feedback signal.

The electronic device 101 according to embodiments of the present disclosure determines a state of at least one performing device and determines at least one performing device to perform the determined function based on the determined state.

Figure 9:
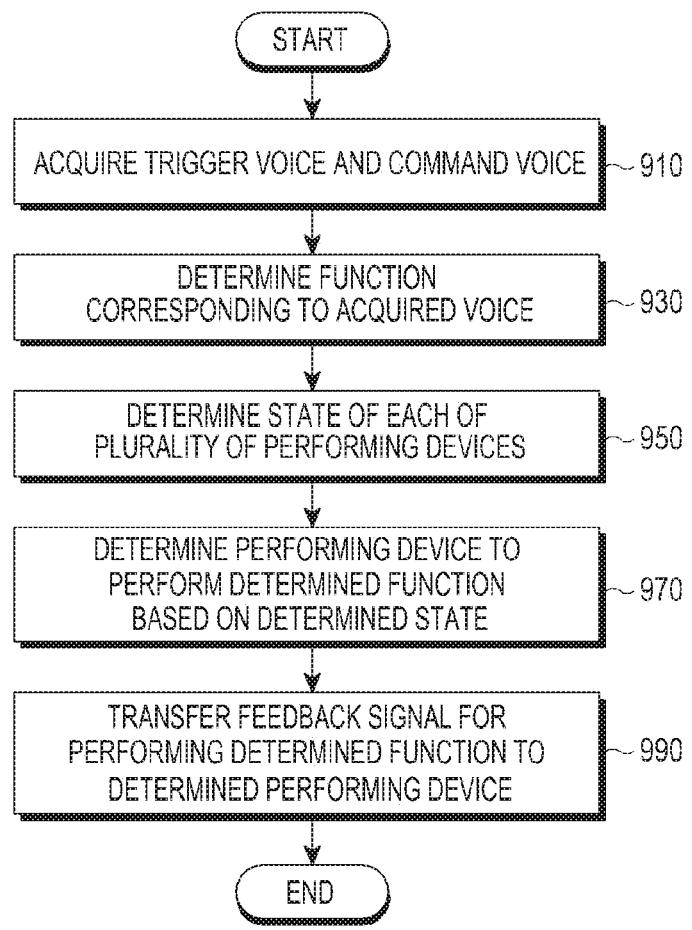
FIG. 9 illustrates a method of determining a performing device according to embodiments of the present disclosure.

FIG. 9 illustrates a method of determining a performing device according to embodiments of the present disclosure.

Referring to FIG. 9, the electronic device 101 acquires a trigger voice and a command voice in step 910. The electronic device 101 receives a voice signal including the trigger voice and the command voice from an external device the audio device 400 and acquires the trigger voice and the command voice based on the received voice signal. According to another embodiment, the electronic device 101 acquires the trigger voice and the command voice through the microphone 288 included in the electronic device 101.

In step 930, the processor 120 or 210 determines a function corresponding to the acquired voice. The processor 120 or 210 recognizes the trigger voice in the acquired trigger voice and command voice and activates a voice function based on the recognized trigger voice. The processor 120 or 210 recognizes the acquired command voice based on the activated voice function and determines a function corresponding to a command of the recognized command voice.

In step 950, the processor 120 or 210 determines a state of each of a plurality of performing devices which can perform the function of the command voice. For example, the processor 120 or 210 determines a state of each of the electronic device 101 and an external device which are the plurality of performing devices.

The processor 120 or 210 determines whether a cover of the electronic device 101 covers the display 260 of the electronic device 101, based on a sensing value sensed through a sensor corresponding to the cover of the electronic device 101.

In another example, the processor 120 or 210 determines a distance between the electronic device 101 and the audio device 400, based on a received signal reception strength between the electronic device 101 and the audio device 400, such as a received signal strength indication (RSSI).

The electronic device 101 determines various states related to each of the plurality of performing devices which can perform the function according to the command voice.

In step 970, the processor 120 or 210 determines at least one performing device which performs the determined function based on the state of each of the plurality of determined performing devices.

When the cover of the electronic device 101 covers the display 260 of the electronic device 101, the processor 120 or 210 determines an external device including a display as the performing device to perform the determined function in accordance with a display function which is the determined function. Alternatively, when the cover of the electronic device 101 does not cover the display 260 of the electronic device 101, the processor 120 or 210 determines the electronic device 101 including the display 260 as the performing device in accordance with the display function which is the determined function.

According to another embodiment, when the distance between the electronic device 101 and the audio device 400 is within a reference distance, the processor 120 or 210 determines the electronic device 101 and the audio device 400 as the performing devices in accordance with an audio output function which is the determined function. For example, the reference distance is a predetermined distance value configured by the user of the audio device or the manufacturer. Alternatively, when the distance between the electronic device 101 and the audio device 400 is greater than or equal to the reference distance, the processor 120 or 210 determines the audio device 400 as the performing device in accordance with the audio output function which is the determined function.

The electronic device 101 further determines the performing device to perform the determined function based on the state of each of the plurality of determined performing devices.

In step 990, the processor 120 or 210 transfers a feedback signal, which is a control signal for performing the determined function, to the determined performing device. Accordingly, the performing device having received the feedback signal performs a function corresponding to the feedback signal.

When the one or more performing devices corresponding to the determined function among a plurality of performing devices are determined as the audio device 400 which is the external device, the processor 120 or 120 transmits the feedback signal corresponding to the control signal for performing the determined function to the audio device 400. The audio device 400 outputs audio data corresponding to the received feedback signal.

According to another embodiment, when the one or more performing devices corresponding to the determined function among the plurality of performing devices are determined as the electronic device 101, the processor 120 or 210 transmits the feedback signal corresponding to the control signal for performing the determined function to an element of the electronic device 101 corresponding to the determined function. For example, when the determined function is a display function, the processor 120 or 210 transfers a feedback signal to the display 260 to display an image corresponding to the determined function. The display 260 displays an image corresponding to the received feedback signal.

The electronic device 101 according to embodiments of the present disclosure acquires voice recognition model update information including information related to voice recognition and transmits the acquired voice recognition model update information to the audio device 400. Accordingly, the electronic device 101 enables the audio device 400, which performs communication, to update the voice recognition model information.

Figure 10:
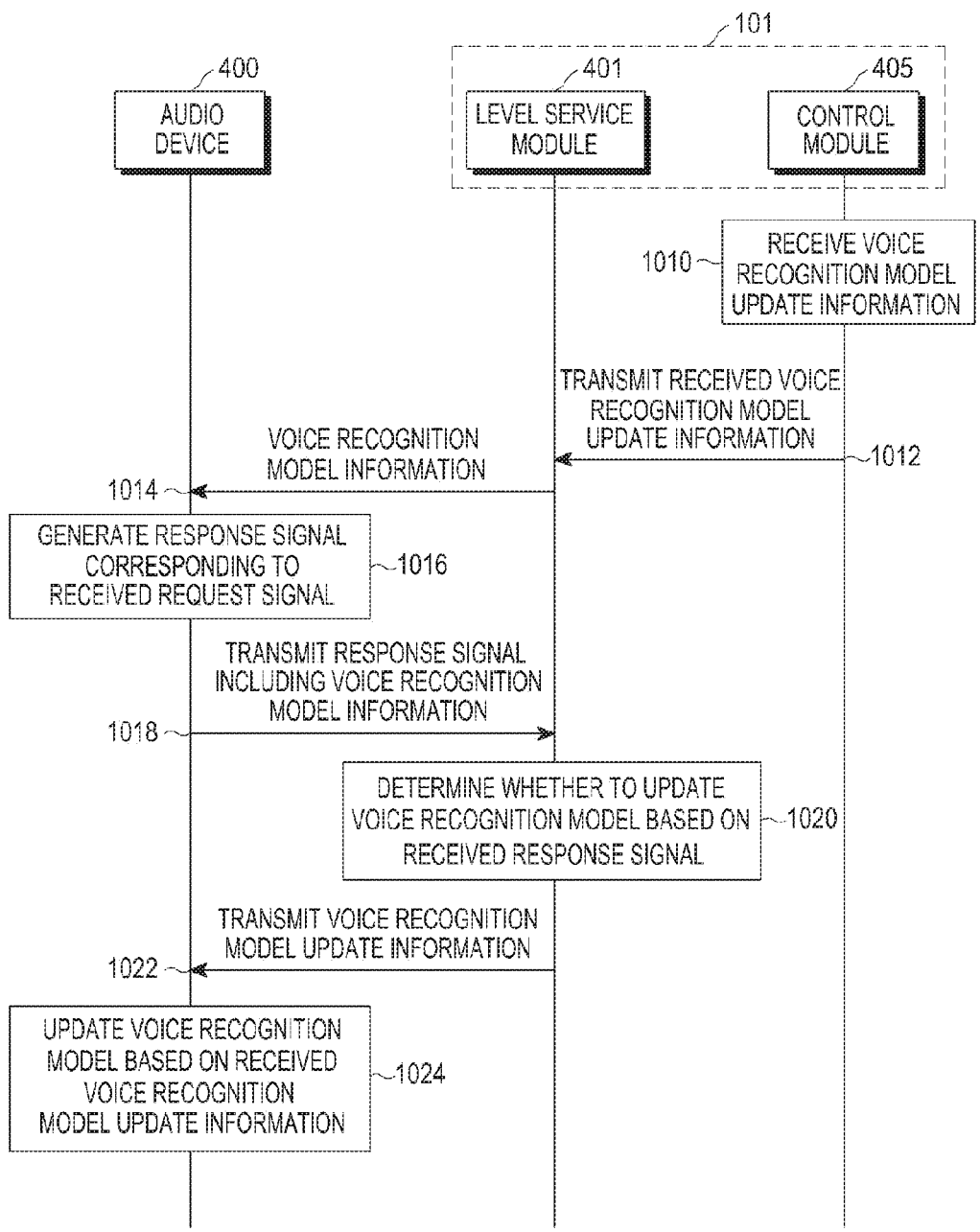
FIG. 10 illustrates a method of updating a voice recognition model according to embodiments of the present disclosure.

FIG. 10 illustrates a method of updating a voice recognition model according to embodiments of the present disclosure.

Referring to FIG. 10, the control module 405 of the electronic device 101 receives voice recognition model update information in step 1010. For example, the control module 405 acquires the voice recognition model update information from the server 106 through the communication module 220. The voice recognition model update information may refer to information for updating a voice recognition module, and includes at least one of information on a trigger voice and a command voice and a voice recognition algorithm. For example, the voice recognition model includes an acoustic model. In another example, the control module 405 receives the voice recognition model update information from the voice processing module 403. Alternatively, the voice processing module 403 generates voice recognition model update information based on a voice received through the microphone 288 and transfers the generated voice recognition model update information to the control module 405.

In step 1012, the control module 405 of the electronic device 101 transfers the received voice recognition model update information to the level service module 401.

In step 1014, the level service module 401 may request the voice recognition model information to the audio device 400. For example, the level service module 401 transmits a request signal, which makes a request for information on the voice recognition model applied to the audio device 400, to the audio device 400 through the communication module 220.

In step 1016, the audio device 400 generates a response signal corresponding to the received request signal, such as a response signal including information on the voice recognition model applied to the audio device 400 in response to the received request signal. In step 1018, the audio device 400 transmits the generated response signal to the electronic device 101.

In step 1020, the level service module 401 of the electronic device 101 determines whether to update the voice recognition model based on the received response signal. For example, the level service module 401 determines whether the received voice recognition model update information is newer than voice recognition model applied to the audio device 400 based on the response signal transmitted from the audio device 400. When the received voice recognition model update information is the newer than the voice recognition model applied to the audio device 400, the level service module 401 determines that the audio device 400 needs to update the voice recognition model. When the received voice recognition model update information is not the newer than the voice recognition model applied to the audio device 400, the level service module 401 determines that the audio device 400 does not need to update the voice recognition model.

Information on the request for the voice recognition model information and reception of the response signal may be omitted, and the level service module 401 of the electronic device 101 may determine whether to update the voice recognition model based on information on the voice recognition model applied to the audio device 400, which is stored in the memory. For example, the memory 130 or 230 stores the information on the voice recognition model applied to the audio device 400 and provides the stored information to the level service module 510. Accordingly, the level service module 401 compares the stored voice recognition model information and the received voice recognition model update information.

When it is determined that the update is required, the level service module 401 of the electronic device 101 transmits the voice recognition model update information to the audio device 400 in step 1022. The level service module 401 converts or changes the voice recognition model according to the voice recognition model update information in order to transfer the received voice recognition model update information to the audio device 400 and converts or changes the voice recognition model according to the voice recognition model update information in order to cause the audio device 400 update the voice recognition model.

In step 1024, the audio device 400 updates the voice recognition model based on the received voice recognition model update information. Accordingly, the audio device 400 operates with the updated voice recognition model.

The audio device 400 may directly receive and update the voice recognition model update information. When a processing capability of the electronic device 101 is greater than a processing capability of the audio device 400, the audio device 400 receives the voice recognition model update information from the electronic device 101 and updates the voice recognition model as described above.

The electronic device 101 according to embodiments of the present disclosure outputs information for acquiring a recognizable voice according to whether at least one of the acquired trigger voice and command voice can be recognized.

Figure 11:
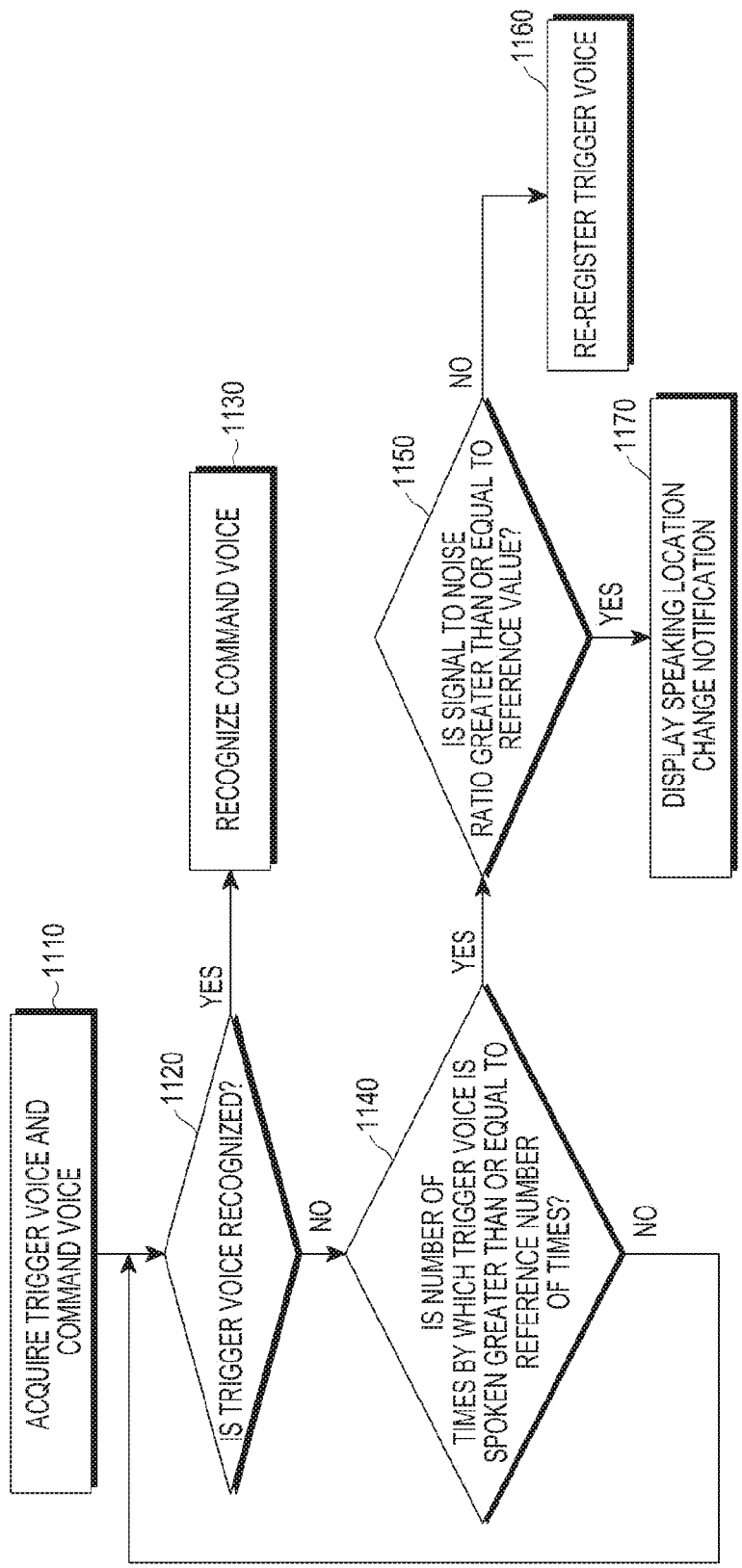
FIG. 11 illustrates an operation method of acquiring a recognizable voice by an electronic device according to embodiments of the present disclosure.

FIG. 11 illustrates an operation method of acquiring a recognizable voice by an electronic device according to embodiments of the present disclosure.

Referring to FIG. 11, the electronic device 101 acquires at least one of a trigger voice and a command voice in step 1110. The electronic device 101 receives a voice signal including at least one of the trigger voice and the command voice from an external device and acquires the trigger voice and the command voice based on the received voice signal. According to another embodiment, the electronic device 101 acquires at least one of the trigger voice and the command voice through the microphone 288 included in the electronic device 101. Alternatively, the electronic device 101 acquires at least one of the trigger voice and the command voice through each of the external device and the microphone 288, selects or combines voices acquired through each of the external device and the microphone 288, and acquires at least one of the trigger voice and the command voice.

In step 1120, the voice processing module 403 determines whether the trigger voice in the acquired voice is recognized.

When the trigger voice is recognized, the processor 120 or 210 recognizes the command voice in the acquired voice in step 1130 and performs a function corresponding to the recognized command voice. Since the command voice recognition and the function performance by the electronic device 101 have been described above, a detailed description thereof will be omitted.

When the trigger voice is not recognized, the electronic device 101 the processor 120 or 210 determines whether a number of times by which the user speaks the trigger voice is greater than or equal to a reference number of times in step 1140. The processor 120 or 210 determines whether the number of times by which the user speaks the trigger voice is greater than two times which correspond to the reference number of times.

When the number of times by which the user speaks the trigger voice is less than the reference number of times, the electronic device 101 returns to step 1120 to determine whether the trigger voice is recognized based on a re-acquired voice. When the number of times by which the user speaks the trigger voice is greater than or equal to the reference number of times, the electronic device 101 the processor 120 or 210 determines whether a signal to noise ratio corresponding to the acquired voice is greater than or equal to a reference value in step 1150. The signal to noise ratio (SNR) refers to a ratio between a user's voice and noise in the acquired voice.

When the SNR is less than the reference value, the electronic device 101 the processor 120 or 210 re-registers the trigger voice in step 1160. The electronic device 101 displays a menu screen for re-registering the trigger voice on the display 160 or 260 and output a notification voice for re-registering the trigger voice into one or more of the speaker 282 and the audio device 400. The electronic device 101 enables various external devices, which perform communication, to output at least one of the menu screen for re-registering the trigger voice and the notification voice for re-registering the trigger voice.

When the signal to noise ratio is greater than or equal to the reference value, the electronic device 101 the processor 120 or 210 displays a speaking location notification screen for changing a speaking location in which the voice including at least one of the trigger voice and the command voice is spoken in step 1170. The electronic device 101 displays the speaking location notification screen for changing the speaking location on the display 160 or 260 and outputs a speaking location notification voice for changing the speaking location into one or more of the speaker 282 and the audio device 400. The electronic device 101 enables various external devices to output at least one of the speaking location notification screen and the speaking location notification voice. In addition, the electronic device 101 outputs a noise value of a current speaking location as at least one of an image or audio data along with a notification for the change in the speaking place. As described above, the electronic device 101 performs an operation for the voice re-registration or the speaking location change notification based on whether at least one of the acquired trigger voice and command voice is recognized.

Each of the components of the electronic device according to the present disclosure may be implemented by one or more components and the name of the corresponding component may vary depending on a type of the electronic device. In embodiments, the electronic device includes at least one of the above-described elements. Some of the above-described elements may be omitted from the electronic device, or the electronic device may further include additional elements. Some of the components of the electronic device according to the embodiments of the present disclosure may be combined to form a single entity, and thus, may equivalently execute functions of the corresponding elements prior to the combination.

The term "module" as used herein may indicate a unit including one of hardware, software, and firmware or a combination of two or more of them. The "module" may be interchangeably used with any of the terms "unit", "logic", "logical block", "component", and "circuit". The "module" may be a minimum unit of an integrated component element or a part thereof, or a minimum unit for performing one or more functions or a part thereof, and may be mechanically or electronically implemented. For example, the "module" according to the present disclosure may include at least one of an application-specific integrated circuit (ASIC) chip, a field-programmable gate arrays (FPGA), and a programmable-logic device for performing operations which are known or may be developed in the future.

At least some of the devices or the method according to the present disclosure may be implemented by a command stored in a computer-readable storage medium in a programming module form. The instruction, when executed by a processor, may cause the one or more processors to execute the function corresponding to the instruction. The computer-readable storage medium may be the memory 130.

The computer readable recoding medium includes a hard disk, a floppy disk, magnetic tape, optical media such as a compact disc read only memory (CD-ROM) and a digital versatile disc (DVD), magneto-optical mediasuch as a floptical disk, and a hardware device, such as a Read Only Memory (ROM), a RAM, and a flash memory. In addition, the program instructions include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure includes one or more of the aforementioned components and may further include other additional components, or some of the aforementioned components may be omitted. Operations executed by a module, a programming module, or other component elements according to embodiments of the present disclosure may be executed sequentially, in parallel, repeatedly, or in a heuristic manner. Some operations may be executed according to another order or may be omitted, or other operations may be added.

Embodiments disclosed herein are provided merely to easily describe technical details of the present disclosure and to assist in the understanding of the present disclosure, and are not intended to limit the scope of the present disclosure. Therefore, it should be construed that all modifications and changes or modified and changed forms based on the technical idea of the present disclosure fall within the scope of the present disclosure.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a housing;
a wireless communication module located within the housing;
a microphone;
a speaker;
a display exposed through at least a part of the housing;
a memory; and
a processor electrically connected to the memory,
wherein the memory stores a program supporting voice recognition, and stores instructions that instruct the processor to:
receive a voice signal through the wireless communication module or through the microphone,
detect a first signal including a request for triggering the voice recognition from the voice signal by comparing the voice signal with a database regarding a predetermined trigger voice,
detect a second signal including voice data corresponding to a user's speaking by excluding the first signal from the voice signal, the speaking including at least one verb but not including a target associated with the verb,
perform the voice recognition on a voice included in the detected voice data,
determine an operation corresponding to the recognized voice based on at least a part of the verb, receive information related to a state of at least one external device, wherein the state of the at least one external device is variable, determine a state of each of the electronic device and the at least one external device based on the information, determine one or more performing devices which perform the determined operation based on the state of each of the electronic device and the at least one external device, and enable the one or more determined performing devices to perform the determined operation when the instructions are executed, wherein the one or more performing devices includes at least one of the electronic device and an external device that has transmitted the voice signal, the external device being included in the at least one external device.

2. The electronic device of claim 1, wherein the target associated with the verb includes the one or more performing devices which perform the determined operation.

3. The electronic device of claim 1, wherein the memory further stores instructions that instruct the processor to determine the one or more performing devices which perform the determined operation corresponding to a characteristic of the verb when the instructions are executed.

4. The electronic device of claim 1, wherein the memory further stores instructions that instruct the processor to determine the one or more performing devices which perform the determined operation corresponding to a characteristic of the determined operation when the instructions are executed.

5. The electronic device of claim 1, wherein the at least one external device includes an external device that has not transmitted the voice signal.

6. The electronic device of claim 1, wherein the determined performing device is the electronic device, and the memory further stores instructions that instruct the processor to cause the display to perform an operation corresponding to the determined operation when the instructions are executed.

7. The electronic device of claim 1, wherein the determined performing device is the at least one external device, which has transmitted the voice signal, and the memory further stores instructions that instruct the processor to transmit a feedback signal including at least one of audio data and voice data to the at least one external device that has transmitted the voice signal when the instructions are executed.

8. The electronic device of claim 1, wherein the memory further stores instructions that instruct the processor to provide a plurality of candidate devices, which can perform the determined operation, through at least one of the display and the wireless communication module, to acquire an input for selecting one or more of the plurality of candidate devices, and to determine the one or more performing devices which perform the determined operation among the one or more selected candidate devices when the instructions are executed.

9. A method operating an electronic device communicating with one or more external devices, the method comprising:

receiving a voice signal from the one or more external devices;

detecting a first signal including a request for triggering voice recognition from the voice signal by comparing the voice signal with a database regarding a predetermined trigger voice;

detecting a second signal including voice data corresponding to a user's voice by excluding the first signal from the voice signal;

performing, through the triggered program, the voice recognition on the detected voice data;

determining an operation corresponding to the recognized voice;

receiving information related to a state of at least one external device, wherein the state of the at least one external device is variable;

determining a state of each of the electronic device and the at least one external device based on the information;

determining one or more performing devices which perform the determined operation based on the state of each of the electronic device and the at least one external device; and enabling the one or more determined performing devices to perform the determined operation, wherein the performing device includes at least one of the electronic device and the one or more external devices, and wherein the one or more external devices includes an external device that has transmitted the voice signal.

10. The method of claim 9, wherein the one or more external devices includes an external device that has not transmitted the voice signal.

11. The method of claim 9, wherein the determined performing device is the electronic device, and performing the determined operation comprises performing an operation corresponding to the determined operation by a display of the electronic device.

12. The method of claim 9, wherein the determined performing device is the at least one external device that has transmitted the voice signal, and the method further comprises transmitting a feedback signal including at least one of audio data and voice data to the at least one external device that has transmitted the voice signal.

13. The method of claim 9, wherein determining the one or more performing devices comprises:

providing a plurality of candidate devices, which can perform the determined operation, through at least one of a display of the electronic device and the one or more external devices;

acquiring an input for selecting one or more of the plurality of candidate devices; and determining one or more performing devices which perform the determined operation among the one or more selected candidate devices.

14. An electronic device comprising:

a memory;

a wireless communication module that communicates with one or more external devices; and a memory; and a processor electrically connected to the memory, wherein the memory stores instructions that instruct the processor to receive a voice signal from the one or more external devices through the wireless communication module, to detect a trigger voice from the voice signal by comparing the voice signal with a database regarding a predetermined trigger voice, to activate a voice function based on the trigger voice, to detect a command voice by excluding the trigger voice from the voice signal, to recognize the command voice based on the activated voice function, to determine a function corresponding to the recognized command voice, to receive information related to a state of the one or more external devices, to determine a state of each of the electronic device and the one or more external devices based on the information, to determine one or more performing devices which perform the determined function based on the state of each of the electronic device and the one or more external devices, and to perform the determined function operation when the instructions are executed in response to determining that the electronic device is the performing device, wherein the state of the at least one external device is variable, wherein the one or more performing devices includes at least one of the electronic device and the one or more external devices, and wherein the one or more external devices includes an external device that has transmitted the voice signal.

15. The electronic device of claim 14, wherein the memory further stores instructions that instruct the processor to determine one or more candidate devices corresponding to the determined function among a plurality of candidate devices, which can perform the determined operation, as the one or more performing devices when the instructions are executed.

16. The electronic device of claim 14, wherein the memory further stores instructions that instruct the processor to determine a state of each of the plurality of candidate devices which can perform the determined operation and to determine the one or more performing devices to perform the determined function based on the state of each of the determined candidate devices when the instructions are executed.

17. The electronic device of claim 14, wherein the memory further stores instructions that instruct the processor to transmit a feedback signal for performing the determined function to the one or more determined performing devices when the instructions are executed.

* * * * *